United States Patent
Engström et al.

(10) Patent No.: US 10,097,401 B2
(45) Date of Patent: Oct. 9, 2018

(54) METHOD OF PROVIDING PERFORMANCE MANAGEMENT DATA, CORRESPONDING NETWORK ELEMENT AND CORRESPONDING RADIO COMMUNICATION SYSTEM

(71) Applicant: Telefonaktiebolaget LM Ericsson (publ), Stockholm (SE)

(72) Inventors: Stefan Engström, Linköping (SE); Tobias Ahlström, Ljungsbro (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 255 days.

(21) Appl. No.: 14/900,569

(22) PCT Filed: Jul. 1, 2014

(86) PCT No.: PCT/EP2014/063979
§ 371 (c)(1),
(2) Date: Dec. 21, 2015

(87) PCT Pub. No.: WO2015/000908
PCT Pub. Date: Jan. 8, 2015

(65) Prior Publication Data
US 2016/0156500 A1    Jun. 2, 2016

(30) Foreign Application Priority Data
Jul. 1, 2013   (EP) ..................................... 13003331

(51) Int. Cl.
*H04L 12/24* (2006.01)
*H04W 24/00* (2009.01)
(Continued)

(52) U.S. Cl.
CPC ......... *H04L 41/0233* (2013.01); *H04W 24/00* (2013.01); *H04W 24/02* (2013.01); *H04W 24/08* (2013.01)

(58) Field of Classification Search
CPC .. H04L 41/0233; H04W 24/00; H04W 24/02; H04W 24/08
See application file for complete search history.

(56) References Cited

U.S. PATENT DOCUMENTS

2009/0111382 A1\* 4/2009 Yao ..................... H04L 41/5009
455/67.7
2012/0315949 A1   12/2012 Zhang et al.
(Continued)

FOREIGN PATENT DOCUMENTS

WO    WO 2013/010566 A1    1/2013
WO    WO 2013/066241 A     5/2013

OTHER PUBLICATIONS

International Search Report and Written Opinion of the International Searching Authority, Application No. PCT/EP2014/063979, dated Aug. 8, 2014.
(Continued)

*Primary Examiner* — Kwang B Yao
*Assistant Examiner* — Moo Ryong Jeong
(74) *Attorney, Agent, or Firm* — Sage Patent Group (57) ABSTRACT

A technique of providing performance management (PM) data by a network element of a wireless network to an Operations and Maintenance, OAM, system to which the network element is connected. A method embodiment of the providing PM data to the OAM system to which the network element is connected, the PM data being related to one or more objects associated with the network element, includes determining, by the network element, whether at least one of the one or more objects is an unmirrored object, the unmirrored object being invisible to the OAM system. If at least
(Continued)

one of the one or more objects is an unmirrored object, the method accumulates, by the network element, PM data of the at least one unmirrored object with PM data of further objects associated with the network element; and provides, by the network element, the accumulated PM data to the OAM system.

14 Claims, 8 Drawing Sheets

(51) Int. Cl.
*H04W 24/02* (2009.01)
*H04W 24/08* (2009.01)

(56) References Cited

U.S. PATENT DOCUMENTS

| 2014/0120930 | A1* | 5/2014 | Harris | H04W 24/08 |
| | | | | 455/452.1 |
| 2015/0382209 | A1* | 12/2015 | Sanneck | H04W 24/10 |
| | | | | 370/252 |

OTHER PUBLICATIONS

3GPP, Technical Specification, "3rd Generation Partnership Project; Technical Specification Group Services and System Aspects; Telecommunication management; Performance Management (PM); Concept and requirements (Release 12)", 3GPP TS 32.401 V12.0.0 (Oct. 2014), 29 pp.

3GPP, Technical Specification, "3rd Generation Partnership Project; Technical Specification Group Services and System Aspects; Telecommunication management; Performance Management (PM); Performance measurements; Universal Terrestrial Radio Access Network (UTRAN) (Release 12)", 3GPP TS 32.405 V12.0.0 (Oct. 2014), 189 pp.

3GPP, Technical Specification, "3rd Generation Partnership Project; Technical Specification Group Services and System Aspects; Telecommunication management; Performance Management (PM); Integration Reference Point (IRP): Requirements (Release 11)", 3GPP TS 32.411 V11.0.0 (Sep. 2012), 10 pp.

3GPP, Technical Specification, "3rd Generation Partnership Project; Technical Specification Group Services and System Aspects; Telecommunication management; Performance Management (PM); Integration Reference Point (IRP): Information Service (IS) (Release 11)", 3GPP TS 32.412 V11.1.0 (Dec. 2012), 68 pp.

3GPP, Technical Specification, "3rd Generation Partnership Project; Technical Specification Group Services and System Aspects; Telecommunication management; Performance Management (PM); Performance measurements Evolved Universal Terrestrial Radio Access Network (E-UTRAN) (Release 12)", 3GPP TS 32.425 V12.0.0 (Jun. 2013), 74 pp.

3GPP, Technical Specification, "3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11)", 3GPP TS 32.762 V11.5.0 (Mar. 2013), 59 pp.

3GPP, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.5.0 (Mar. 2013), 209 pp.

3GPP, Technical Specification, "3rd Generation Partnership Project; Technical Specification Group Radio Access Network; Evolved Universal Terrestrial Radio Access Network (E-UTRAN); X2 signalling transport (Release 12)", 3GPP TS 36.422 V12.0.0 (Sep. 2014), 8 pp.

Stewart, "Stream Control Transmission Protocol", Network Working Group, Request for Comments: 4960 (Obsoletes: 2960, 3309), Category: Standards Track, Sep. 2007, 152 pp.

\* cited by examiner

METHOD OF PROVIDING PERFORMANCE MANAGEMENT DATA, CORRESPONDING NETWORK ELEMENT AND CORRESPONDING RADIO COMMUNICATION SYSTEM

CROSS REFERENCE TO RELATED APPLICATIONS

This application is a 35 U.S.C. § 371 national stage application of PCT International Application No. PCT/EP2014/063979, filed on Jul. 1, 2014, which itself claims priority to European patent Application No. 13003331.9, filed Jul. 1, 2013, the disclosure and content of both of which are incorporated by reference herein in their entireties. The above-referenced PCT International Application was published in the English language as International Publication No. WO 2015/000908 A1 on Jan. 8, 2015.

TECHNICAL FIELD

The present disclosure relates to the field of performance management. More specifically, the present disclosure relates to a technique of providing performance management (PM) data by a network element of a wireless network to an Operations and Maintenance, OAM, system to which the network element is connected.

BACKGROUND

Wireless networks (which are sometimes also referred to as wireless communications networks, wireless telecommunications networks or cellular networks, for example) are radio networks which are usually divided into cells, each served by at least one base station (sometimes also called radio base stations).

Different cells in the mobile network experience various loads, interference, variations in load and variations in the number of mobile terminals, like User Equipments (UEs), being located within the different cells. These variations often result in performance variations in different cells and possibly temporary overloads of the capacity or resources in certain cells during, for example, peak hours. In order to supervise the wireless communication network, different performance management (PM) measurements (are briefly just performance measurements (PM)) are performed on, for example, cell level.

In order to supervise a wireless communications network, the different nodes (which may also be referred to as network elements or network nodes) in the wireless communications network may record events by using counters, and the counter values are reported or sent regularly to an Operation and Maintenance, OAM, system. These different counters may be part of PM measurement data. Some of these counters may be per cell or neighbour cell relation (CR). A CR is related to a relation between two neighbouring cells in the wireless communications network.

In $3^{rd}$ Generation Partnership Project (3GPP) Technical Specification (TS) 32.401 the overall concept and requirements for PM measurements are described. The PM measurements are used to denote the overall cell level performance, instead of the individual UE level performance as in the case of Minimization of Drive Test (MDT) data. In this context, it is also referred, for instance, to TS 32.425 for E-UTRAN PM measurements and 32.405 for UTRAN PM measurements.

Communication networks are being more densified using many radio access technologies (RAT), many frequencies and a mix of large and (many) small cells in the same places. This densification results in that cells in these networks get very many neighbour cells (NC) on different frequencies and RATs. A cell then has a CR to each of these neighbour cells. Typically, each cell has several neighbour relations to other neighbouring cells. A wireless communication network may comprise a very large amount of cells, each cell having a plurality of CRs, resulting in a vast amount of CRs.

Traditionally PM data, like counters, statistics and/or events, is produced in the network and reported to OAM systems, for example, for every CR. With the said densification, the amount of PM data grows into numbers that are difficult to handle in the network nodes, by the backhaul network and in the OAM systems. A network node holds representations not only of the cells controlled by the node itself but also of external cells, cells that are controlled by other network nodes. Some of these ECs are also NCs. The total amount of external cells (EC) and CRs over the network also becomes a problem for the OAM systems. This may be especially the case for Long Term Evolution (LTE) networks, where every base station, which is usually referred to as eNodeB or eNB in LTE, has its own set of ECs and CRs that is mirrored in the OAM systems.

With many CRs, the total amount of measured PM data can thus be extensive. With the so called Automatic Neighbour Relations (ANR) feature in wireless networks, mobile terminals can uniquely identify neighbours meaning that the CRs are automatically introduced upon discovery. Hence, handling PM (measurement) data is a challenge, both in terms of signalling to the OAM system as well as in database storage in the OAM system.

Current solutions, e.g., as described in WO 2013/010566 A1 and WO2013/066241 A1, aim at reducing the PM data to be handled by the OAM systems by reducing or excluding PM data reporting for selected CRs.

SUMMARY

There is a need for a technique which provides at least some observability of one or more objects that are invisible to the OAM system(s).

According to a first aspect, a method of providing performance management (PM) data by a network element of a wireless network to an Operations and Maintenance (OAM) system is provided. The network element is connected to the OAM system.

The PM data is related to one or more objects associated with the network element. The method comprises: determining, by the network element, whether at least one of the one or more objects is an unmirrored object, the unmirrored object being invisible to the OAM system; if at least one of the one or more objects is an unmirrored object, accumulating, by the network element, PM data of the at least one unmirrored object with PM data of further objects associated with the network element; and providing, by the network element, the accumulated PM data to the OAM system.

The one or more objects associated with the network element may respectively be regarded as a representation of a resource in the network element. The one or more objects may each provide one or more interfaces to observe and manage the respective resource(s). The resource may, for example, be a function or a hardware module.

Independent of the exact realization of the object, the object may be an object according to the 3GPP object model, e.g., as specified in 3GPP TS 32.762.

A network element may be any kind of logical entity in the wireless network. The term network element may also be understood as a facility or equipment used in the provision of a (tele)communications service. Such term may include features, functions, and capabilities that are provided by means of such facility or equipment, e.g., used in the transmission, routing, or other provision of a (tele)communications service. For example, the wireless network, at the physical layer, may comprise multiple interconnected network elements.

The network element may also be called network node. For example, the network element may be a physical network node being an active electronic device that is attached to a network, and is capable of sending, receiving, or forwarding information over a communications channel. Just to name a few examples, without limitation, the network element may comprise or be configured as a radio base station or a radio network controller (RNC) in terms of Wideband Code Division Multiple Access (WCDMA) systems or base station controller (BSC) in terms of the Global System for Mobile Communications (GSM). In terms of LTE, the network element may comprise or be configured as an eNodeB (in short: eNB).

As stated above, an unmirrored object may be understood as an object that is invisible to the OAM system. An unmirrored object may likewise be understood as an object that is unobservable (that cannot be observed) by the OAM system. For example, an OAM system may not be able or capable to observe an unmirrored object. In consequence, an unmirrored object is not capable to report PM data to the OAM system in the conventional manner. Rather, the network element associated with the unmirrored object may comprise PM data related to the unmirrored object. For example, the network element associated with the unmirrored object may comprise a storage unit or memory unit for storing PM data related to the unmirrored object.

PM measurements may be understood as measurements aggregated to cell level. The PM measurements may be used to denote the overall cell level performance, instead of the individual UE level performance as in the case of Minimization of Drive Test (MDT) data. In this context, it is referred, for instance, to TS 32.425 for E-UTRAN PM measurements and 32.405 for UTRAN measurements and TS 32.401 for the overall concept and requirements for PM measurements.

PM data may be any kind of performance measurement data related to an object or a network element. The performance measurement data may comprise at least one of events and statistics related to the object or the network element. The events and/or statistics may be recorded by using counters or the like. The derived counter values may then be reported or sent regularly or irregularly (e.g., upon request of the OAM system) to the OAM system as PM measurement data. Some of these counters may be per cell or CR. PM measurements may include statistics about success rate of connection setups, handovers, radio bearer setups or average cell throughput, utilization, etc. According to 3GPP TS 32.401, the PM measurement result data can be collected in each network element of the network in a number of ways: cumulative incremental counters triggered by the occurrence of a measured event; status inspection (i.e. a mechanism for high frequency sampling of internal counters at pre-defined rates); gauges (i.e. high tide mark, low tide mark); discrete event registration, where data related to a particular event is captured.

The PM data for the at least one unmirrored object and optionally the further unmirrored objects, as stated above with respect to the method according to the first aspect, may be known to the network element associated with the at least one unmirrored object and optionally the further unmirrored objects, e.g., said PM data may be stored in a storage unit or memory unit of the network element.

Just to name a few examples, without limitation, the object may comprise or be configured as information about a neighbour cell (NC). The neighbour cell may use a different frequency and/or RAT. Alternatively or additionally, a neighbour cell relation (CR) of a cell to each of such NCs may be regarded as an object or as being part of an object. Typically, each cell has several CRs to other neighbouring cells. A network element may hold representations not only of the cells associated with or controlled by the network element itself but also of external cells (ECs), which may be regarded as cells that are controlled by other network elements. When a cell has a CR to an EC, the EC may also be referred to as an NC. In consequence, at least some of the ECs may also be NCs. For example, in LTE, the ECs are objects common to all cells in an eNB. The ECs "belong" to the eNB. When there is a CR to an EC, that EC becomes an NC of the cell.

For example, selected ECs and CRs may not be known in/to the OAM systems, but only known in/to the network elements (NEs) of the mobile network, thereby reducing the load on the OAM systems. Such ECs and CRs which are not known in/to the OAM systems, but only known in/to the NEs may be referred to as unmirrored ECs and unmirrored CRs. Alternatively, in order to enable OAM data transport and storage dimensioning, the number of allowed neighbour relations per cell may be limited.

According to a first possible implementation of the method according to the first aspect, the further objects may be unmirrored objects associated with the network element. The further unmirrored objects may belong to the same object class as the at least one unmirrored object. In accordance with this first possible implementation, the step of accumulating may comprise accumulating the PM data of the at least one unmirrored object with the PM data of the further unmirrored objects. In this way, the PM data of two or more unmirrored objects may be accumulated. The two or more unmirrored objects may belong to the same object class. The PM data for the two or more unmirrored objects may be known to the network element, e.g., may be stored in a storage unit or memory unit of the network element.

It is, for example, conceivable that the step of accumulating may comprise accumulating the PM data of all unmirrored objects belonging to the same object class. The PM data of all unmirrored objects belonging to a different object class may, for instance, be accumulated separately. The PM data for all unmirrored objects may be known to the network element, e.g., may be stored in a storage unit or memory unit of the network element.

It is also, for example, conceivable that the step of accumulating may comprise accumulating the PM data of all unmirrored objects which are to be monitored and, optionally, which belong to the same object class. The OAM system may instruct the network element which unmirrored objects are to be monitored. As a result, for all unmirrored objects which are to be monitored and, optionally, which belong to the same object class, the network element may accumulate the respective PM data. The PM data for said unmirrored objects may be known to the network element, e.g., may be stored in a storage unit or memory unit of the network element.

An object may be an instance of an object class. By means of the object class, the object properties, available interfaces and the like may be defined.

According to a first variant of the method according to the first aspect, the step of accumulating may comprise accumulating the PM data, e.g., per object class, on a newly created object. The step of providing may comprise reporting the accumulated PM data to the OAM system on the newly created object.

The step of accumulating may comprise accumulating PM data of unmirrored objects relating to the same object class on the same newly created object. Alternatively or additionally, the step of accumulating may comprise accumulating the PM data of a different object class on a different newly created object. In this way, PM data of unmirrored objects relating to a first object class may be accumulated on a first newly created object. Additionally, PM data of unmirrored objects relating to a second object class may be accumulated on a second newly created object. For example, PM data of unmirrored objects relating to a plurality object classes may be respectively accumulated on a plurality of newly created objects.

According to a second variant of the method according to the first aspect, the step of accumulating may comprise accumulating the PM data, per object class, on a parent object of the at least one unmirrored object. The step of providing may comprise reporting the accumulated PM data to the OAM system on the parent object. The parent object may be the direct parent of the at least one unmirrored object. It is also conceivable that the parent object may be an indirect parent, i.e., one of the parents of the direct parent of the at least one unmirrored object.

It is, for example, conceivable that the step of accumulating may comprise accumulating the PM data of all unmirrored objects belonging to the same parent object. The PM data of all unmirrored objects belonging to a different parent object may, for instance, be accumulated separately. The PM data for all unmirrored objects may be known to the network element, e.g., may be stored in a storage unit or memory unit of the network element.

The at least one unmirrored object may comprise or may be configured as at least one of a neighbour cell object providing information on a neighbour network element of the network element and a neighbour cell relation object providing information on a relationship between the network element and a neighbour network element.

In case of a 3GPP object model realization, the neighbour cell object may be configured as an ExternalEUtranGenericCell object and the neighbour cell relation object may be configured as an EUtranRelation object. In case of the at least one unmirrored object being an EUtranRelation object, the parent object, on which the PM data may be accumulated, may be configured as an EUtranGenericCell object (direct parent) or an ENBFunction object (indirect parent), the latter being the parent of the EUtranGenericCell object.

According to a second possible implementation of the method according to the first aspect, which may be combined with or may be realized independently from the first possible implementation of the method according to the first aspect, the method may further comprise the step of determining, by the network element, whether at least one of the one or more objects is a mirrored object, the mirrored object being visible to the OAM system. A mirrored object may be understood as an object that is visible to the OAM system. A mirrored object may also be understood as an object that is observable (that can be observed) by the OAM system. For example, an OAM system may not be able or capable to observe an unmirrored object such that an unmirrored object reports PM data to the OAM system, but the OAM system may be able or capable to observe a mirrored object such that the mirrored object reports PM data to the OAM system. Instead of a separate reporting of the PM data, the method may further comprise, if at least one of the one or more objects is a mirrored object, accumulating PM data of the at least one mirrored object with the PM data of the at least one unmirrored object.

The step of providing may further comprise reporting information about the identity or identities of the at least one unmirrored object and the further objects for which the PM data is accumulated. The information about the identity or identities may be accumulated together with PM data of the corresponding object(s). The information about the identity or identities may alternatively be made available to the OAM system as attributes, that is information, on a parent object. The parent object may be a direct or indirect parent object.

According to a second aspect, a network element of a wireless network for providing performance management (PM) data to an Operations and Maintenance (OAM) system is provided. The network element is connected to the OAM system. The PM data is related to one or more objects associated with the network element. The network element comprises a determining component, an accumulating component and a transmitting component. The determining component is configured to determine whether at least one of the one or more objects is an unmirrored object, the unmirrored object being invisible to the OAM system. The accumulating component is configured to, if at least one of the one or more objects is an unmirrored object, accumulate PM data of the at least one unmirrored object with PM data of further objects associated with the network element. The transmitting component is configured to provide the accumulated PM data to the OAM system.

The accumulating component may be further configured to accumulate the PM data of all unmirrored objects belonging to the same object class and/or to accumulate the PM data of all unmirrored objects belonging to the same parent object.

The determining component may be further configured to determine whether at least one of the one or more objects is a mirrored object for which PM data is observable by the OAM system. The accumulating component may be further configured to, if at least one of the one or more objects is a mirrored object, accumulate PM data of the at least one mirrored object with the PM data of the at least one unmirrored object.

The network element may comprise or be configured as a radio base station, a radio network controller (RNC) or a base station controller (BSC). The radio base station may be an eNodeB (in short, eNB).

Although not explicitly described herein, the network element may be configured to perform any one of the method aspects as described herein with reference to the method according to the first aspect. For this purpose, the network element may comprise suitable components or units for performing said method aspects.

According to a third aspect, a radio communication system is provided. The radio communication system comprises: the network element as described herein, and an Operations and Maintenance (OAM) system configured to request and maintain the PM data provided by the network element.

According to a fourth aspect, a computer program is provided, the computer program comprising program code portions for performing the steps of any one of the method aspects described herein, when the computer program is run on one or more computing devices. The computer program may be stored on a computer readable recording medium.

BRIEF DESCRIPTION OF THE DRAWINGS

In the following, the present disclosure will further be described with reference to exemplary embodiments illustrated in the figures, in which.

DETAILED DESCRIPTION

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, the skilled person will appreciate that the present disclosure may be practiced in mobile communication systems different from the Long Term Evolution (LTE) standard discussed below to illustrate the present invention. Also, the present disclosure may be practiced in any network to which mobile or stationary users may attach. That is, LTE will be used as the exemplifying radio access technology. However, the embodiments are essentially equally applicable to other radio access technologies as well. Further, although the present disclosure is described below with reference to a specific 3GPP object model, the disclosure is equally applicable to other or future object models.

Those skilled in the art will further appreciate that functions explained herein below may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor and a memory coupled to a processor, wherein the memory is encoded with one or more programs to perform the methods disclosed herein when executed by the processor. Further, when the present disclosure is described as a method, it may also be embodied in suitable units or components configured to perform the method aspects.

Figure 1:
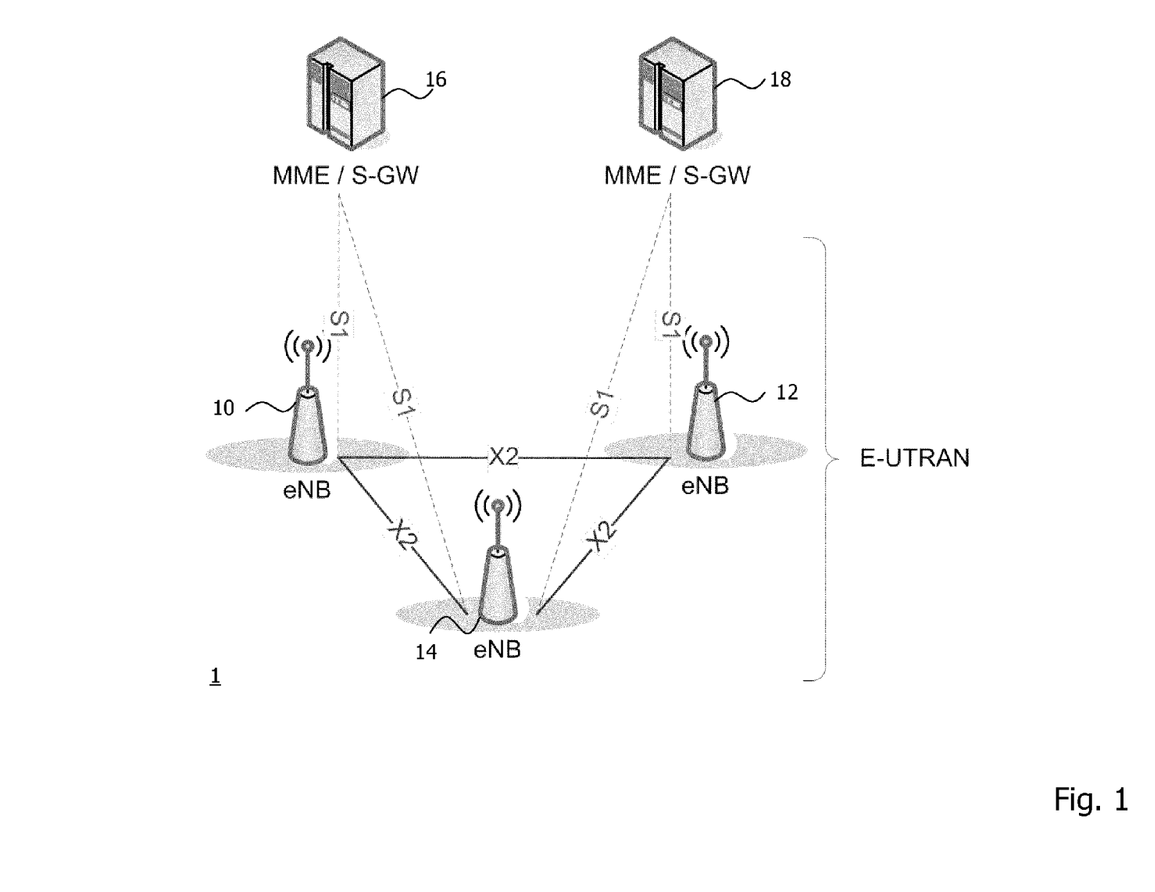
FIG. 1 is a schematic illustration of a general architecture of a wireless network.

The third generation partnership project (3GPP) is still working on standardization of the E-UTRAN radio access system, also called LTE (Long Term Evolution). LTE is part of the Evolved Packet System (EPS), also constituting the Evolved Packet Core (EPC). The architecture of the EPS is schematically shown in FIG. 1. The EPS shown in FIG. 1 includes, as network elements, radio access nodes which are normally referred to in LTE as eNodeBs or eNBs 10, 12, 14 (which will be used interchangeably in the following), and EPC nodes 16, 18. In the exemplary architecture shown in FIG. 1, the EPC nodes 16, 18 may be configured as a Mobility Management Entity (MME) or a Serving Gateway (S-GW). An MME is a control node for the LTE access network. The S-GW routes and forwards user data packets, while also acting as the mobility anchor for the user plane during inter-eNodeB handovers and as the anchor for mobility between LTE and other 3GPP technologies. In the following, it will be referred to the EPC nodes 16, 18 as MMEs 16, 18. The interface between the eNBs 10, 12, 14 is referred to as X2, and the interfaces between the eNBs 10, 14 and the MME 16 as well as the interface between the eNBs 12, 14 and the MME 18 are denoted S1. The signaling transport over X2 and S1 is implemented via Stream Control Transmission Protocol (SCTP), which is, for example, described in 3GPP TS 36.412, 3GPP TS 36.422 and RFC 4960.

Figure 2:
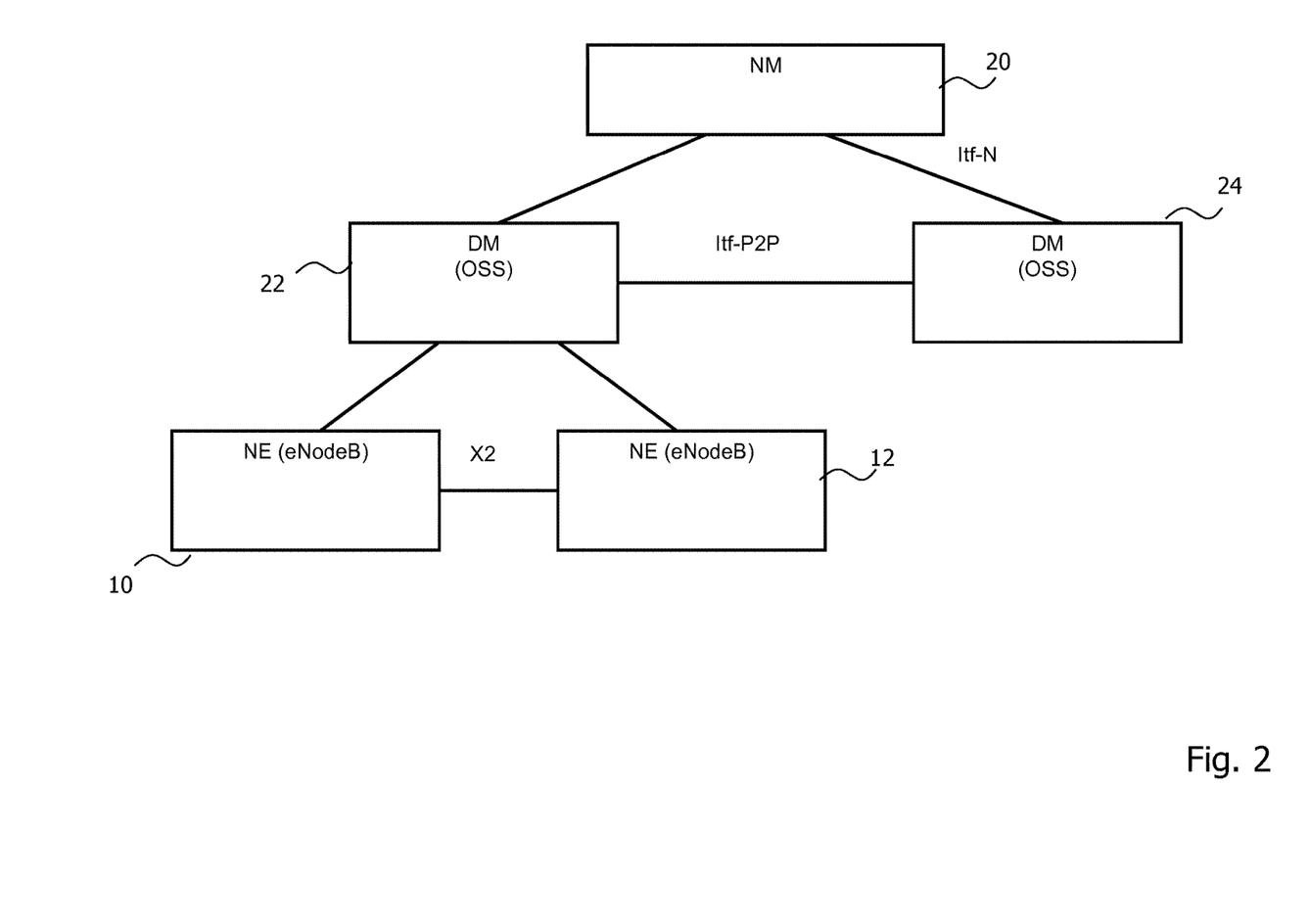
FIG. 2 is a schematic illustration of an OAM system architecture.

FIG. 2 exemplarily shows some further details regarding the management of the eNBs 10, 12. In addition to the eNodeBs 10, 12, which may as a generalization also be referred to as network elements (NEs), a network manager (NM) 20 and two domain managers (DMs) 22, 24 are schematically shown. The NEs in the radio access network, i.e., in the example of FIG. 2, the eNodeBs 10, 12 are managed by one of the DMs, namely the DM 22. The DMs 22, 24 may also be referred to as the operation and support system (OSS). As further exemplarily shown in FIG. 2, the DMs 22, 24 may further be managed by the NM 20. The interface between the DMs 22, 24 and the NM 20 is referred to as Itf-N and the interface between the DMs 22, 24 is referred to as Itf-P2P. The management system, e.g., as formed by the DMs 22, 24 and optionally also the NM 20, may configure the network elements like the eNodeBs 10, 12 as well as receive observations associated to features in the network elements like the eNodeBs 10, 12. For example, the DM 22 observes and configures the eNodeBs 10, 12 as examples of NEs, while the NM 20 observes and configures the DMs 22, 24, as well as the eNodeBs 10, 12 as examples of NEs via the DM 22 (either via DM 22 or via DM 24 and DM 22). The PM measurements are produced by the NEs, e.g., eNBs 10, 12, and are collected by the DM(s) 22, 24 and optionally transferred via the standardized Itf-N interface to the NM 20.

The NM 20 together with the DMs 22, 24, by way of example, form a simple architecture of an Operations and Maintenance (OAM) system.

Figure 3:
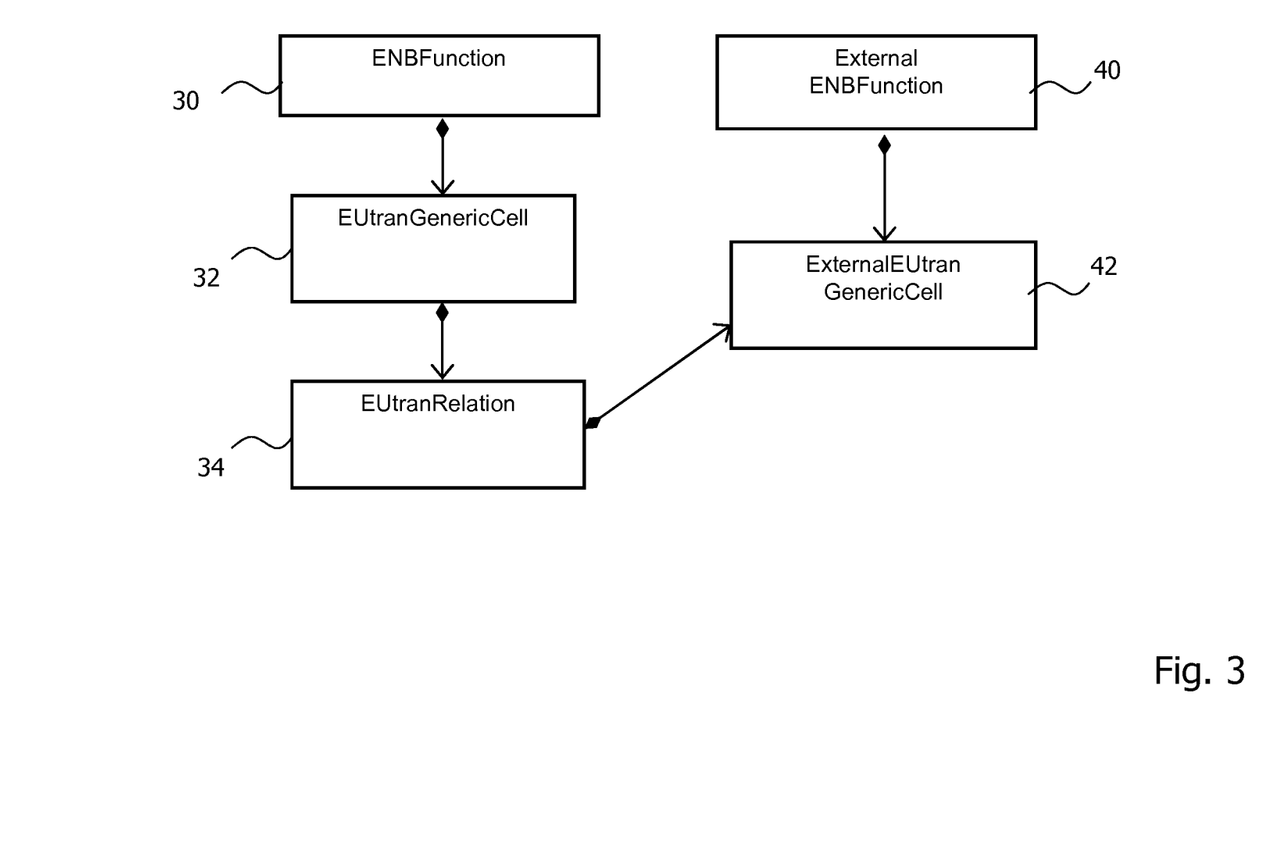
FIG. 3 is a schematic illustration of a part of the 3GPP object model.

FIG. 3 shows part of a conventional so called object model used when communicating over Itf-N, i.e., between the DMs 22, 24 and the NM 20. The objects of the object model are used as a basis for performance management (PM) data reporting from the NEs, e.g., the eNBs 10, 12. To get a complete picture of neighbour cell relations (CRs) and external cells (ECs) in the network, all CRs and ECs are mirrored in the OAM system. When a cell has a CR to an EC, the EC may also be referred to as a neighbour cell (NC). For example, in LTE, the ECs are objects common to all cells in an eNB. The ECs "belong" to the eNB. When there is a CR to an EC, that EC becomes an NC of the cell.

In the conventional object model shown in FIG. 3, the CRs are defined by the EUtranRelation object 34 and the ECs are defined by the ExternalEUtranGenericCell object 42. To update the OAM system, e.g., the NMs 20, one or more of the DMs 22, 24 or both the NMs 20 and one or more of the DMs 22, 24, with performance data and configuration changes in the NEs, the OAM system may subscribe to selected PM counter instances and to updates on selected attributes on selected objects. For example, the management system (OAM system) may subscribe to updates on the ExternalEUtranGenericCell object 42 and the EUtranRelation object 34. Whenever there is a change in one or more of the objects the OAM system subscribed to, i.e., which the OAM system "sees", or whenever one or more of the objects the OAM system subscribed to are used, PM data is sent from the network element associated with the respective object to the OAM system. For example, if there is a handover between two network elements, a cell of the first network element being represented by the EUtranGenericCell object 32 and a cell of the second network element being represented by the ExternalEUtranGenericCell object 42 (in the view or perspective of the first network element, a cell of the second network element is the EC; therefore, in the view of the first network element, a cell of the first network element is represented by the EUtranGenericCell object 32 and a cell of the second network element is represented by the ExternalEUtranGenericCell object 42), the EUtranRelation object 34 is used and associated PM data is sent to the OAM system.

Now, the use of the object model of FIG. 3 will be described with reference to the schematic architecture of FIG. 1. In the following, it is assumed that, in the view of the eNB 10, the EUtranGenericCell object 32 is associated with the cell served by eNB 10, the ExternalEUtranGenericCell object 42 is associated with the cell served by the eNB 12 and a further ExternalEUtranGenericCell object (not shown) is associated with the cell served by eNB 14. Further assuming that a mobile station (because in LTE, a mobile station is normally referred to as User Equipment (UE), the term UE will be used in the following through the description) is located in the cell served by the eNB 10, i.e., the eNB 10 is the serving eNB 10. If the UE enters the cell served by the eNB 12, a handover from the eNB 10 to the eNB 12 is initiated and, as a result of this handover, the eNB 12 becomes the new serving eNB of the UE. By means of this handover from the eNB 10 to the eNB 12, the EUtranRelation object 34 is used (e.g., changed to the extent that counters are stepped) and therefore PM data related to the EUtranRelation object 34 is transmitted to the OAM system.

Still further assuming that a further UE moves from the cell served by the eNB 10 into the cell served by the eNB 14, a handover from the eNB 10 to the eNB 14 is initiated and, as a result of this handover, the eNB 14 becomes the new serving eNB of the further UE. By means of this handover from the eNB 10 to the eNB 14, the further EUtranRelation object (not shown) is used and therefore PM data related to the further EUtranRelation object (not shown) is transmitted to the OAM system.

Typically, multiple UEs move around between cells all the time and therefore handovers occur quite often. For each of these handovers, PM data related to one of the EUtranRelation objects stored in the respective eNB(s) is transmitted to the OAM system.

In case of a highly densified mobile network, this densification results in that cells in these networks get very many NCs and CRs. That is, each cell has several neighbour relations to other neighbouring cells. The network may comprise a very large amount of cells, each cell having a plurality of ECs, resulting in a vast amount of CRs. In consequence, when using the object model of FIG. 3 in the management architecture of FIG. 2, this may result in a vast amount of PM data signaling.

Figure 4:
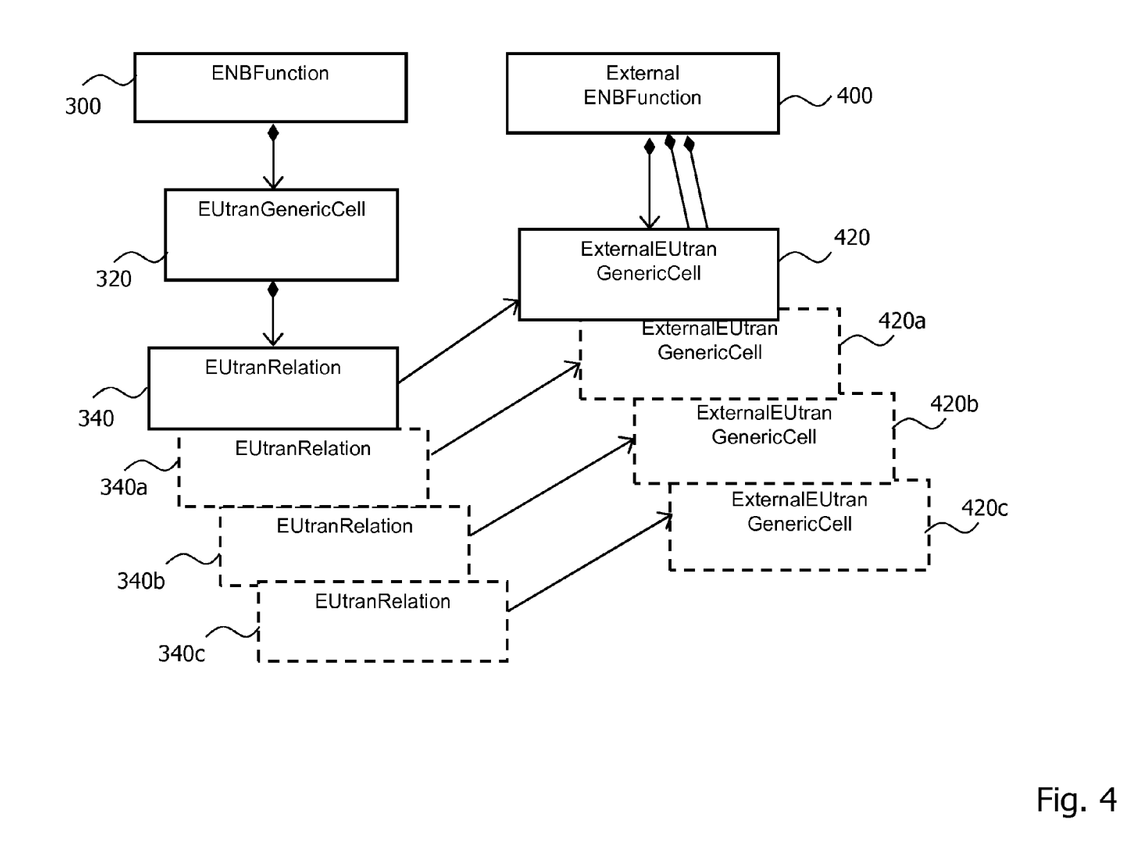
FIG. 4 is a schematic illustration of a part of the 3GPP object model showing mirrored and unmirrored objects.

In order to address the issue of signaling to and storing in the OAM systems a very high amount of PM data, it is contemplated herein that the OAM system does not observe all objects. For example, either the EC or CR object is visible to the OAM system, and the respective object can then be fully observed by the OAM system, or the EC and CR object is not visible to the OAM system and can then not be observed. In accordance with this solution, the unmirrored objects, i.e. the objects that are invisible (not visible) to the OAM system, cannot be observed. An example of this situation is shown in FIG. 4. FIG. 4 exemplarily shows one mirrored EC with one mirrored CR referring to the EC, and three unmirrored ECs (indicated by the dashed lines) with respectively one unmirrored CR referring to the corresponding EC (also indicated by the dashed lines). Speaking in terms of the object model of FIG. 4, one mirrored EUtranRelation object 340 as a CR and one mirrored ExternalEUtranGenericCell object 420 as an EC is provided. The figure also shows a group of unmirrored ECs (unmirrored ExternalEUtranGenericCell objects 420a to 420c) with unmirrored CRs (EUtranRelation objects 340a to 340c). While the EUtranRelation object 340 can be observed by the OAM system to acquire PM data, the OAM system is not capable to observe the unmirrored EUtranRelation objects 340a to 340c, i.e., the OAM system is not capable to acquire PM data associated with the unmirrored EUtranRelation objects 340a to 340c.

In the following, the use of the object model of FIG. 4 is described with reference to the schematic architecture of FIG. 1. In the following, it is assumed that, in the view of the eNB 10, the EUtranGenericCell object 320 is associated with the cell served by eNB 10, the ExternalEUtranGenericCell object 420 is associated with the cell served by the eNB 12 and a further ExternalEUtranGenericCell object 420a is associated with the cell served by eNB 14. The ExternalEUtranGenericCell object 420 and likewise the EUtranRelation 340 (i.e., the relation from eNB 10 to eNB 12) are mirrored objects, i.e. they are visible to the OAM system (the OAM system is able to observe said objects). On the contrary, the ExternalEUtranGenericCell object 420a and likewise the EUtranRelation object 340a (i.e., the relation from eNB 10 to eNB 14) are unmirrored objects, i.e. they are invisible to the OAM system (the OAM system is not able to observe said objects).

Further assuming that a UE is located in the cell served by the eNB 10, i.e., the eNB 10 is the serving eNB 10. If the UE enters the cell served by the eNB 12, a handover from the eNB 10 to the eNB 12 is initiated and, as a result of this handover, the eNB 12 becomes the new serving eNB of the UE. By means of this handover from the eNB 10 to the eNB 12, the EUtranRelation object 340 is used and therefore PM data related to the EUtranRelation object 340 is transmitted to the OAM system.

Still further assuming that a further UE moves from the cell served by the eNB 10 into the cell served by the eNB 14, a handover from the eNB 10 to the eNB 14 is initiated and, as a result of this handover, the eNB 14 becomes the new serving eNB of the further UE. By means of this handover from the eNB 10 to the eNB 14, the further EUtranRelation object 420a is used. However, as the EUtranRelation object 420a is an unmirrored object, PM data related to the EUtranRelation object 420a is not transmitted to the OAM system.

In this way, the amount of PM data signaling to the OAM system and/or storage capacity in the OAM system is reduced. On the other hand, the OAM system does not receive any PM data about the unmirrored objects like the EUtranRelation object 340a and the ExternalEUtranGenericCell object 420a.

Under certain circumstances, it may be of interest to the operator of the network to get an indication of the performance also for unmirrored objects. One reason could be that an object over time becomes more important and should be included into the set of mirrored objects. This may become even more important with the introduction of functions like Automatic Neighbour Relations (ANR), as described in 3GPP TS 36.300. ANR is a function in the network that automatically adds new ECs and CRs. If these then are classified as unmirrored, the OAM system has no knowledge about the new objects and cannot order any PM data from the network element.

To address this issue, it is conceived to provide at least some observability of/for one or more unmirrored objects which are conventionally invisible to the OAM system, i.e., cannot be observed by the OAM system. For this purpose, in addition to the current objects, a new object may be introduced to carry statistics for the unmirrored objects. Alternatively, statistics for the unmirrored objects may be carried on existing objects, like a parent object of the unmirrored object. Counters for the unmirrored objects can then be reported on these new objects or the existing objects. The new objects PM-wise represent a group of unmirrored objects. Counters for all unmirrored objects, e.g., of the object class, under the same parent object, may be summarized and reported on one object. In this way, also PM data for the unmirrored objects can be observed without putting a high load on the OAM system or on the transmission system between the NEs and the OAM system. The new objects are hereafter referred to as PM objects.

Figure 5:
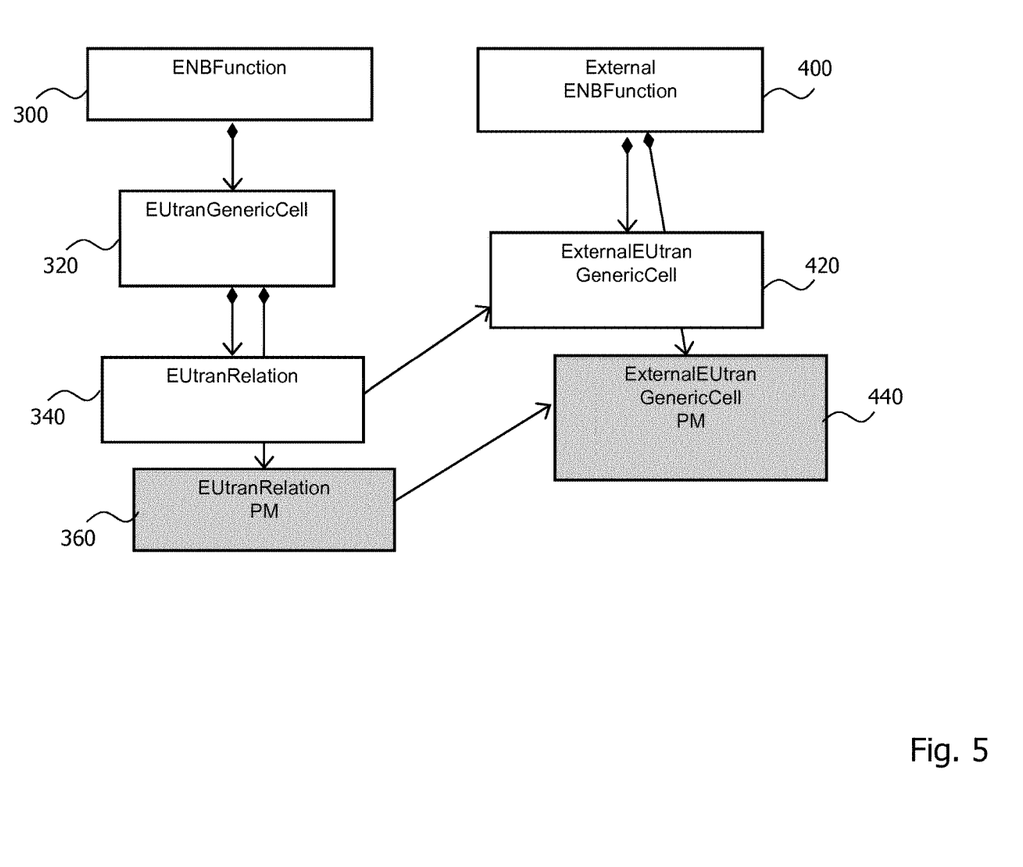
FIG. 5 is a schematic illustration of a part of the 3GPP object model showing mirrored objects and a newly created PM object.

FIG. 5 shows, as a basis, the same example as in FIG. 4, but in FIG. 5 only the mirrored objects are shown. Nevertheless, also unmirrored objects exist in the way as schematically indicated by FIG. 4 and therefore, when referring to unmirrored objects, the reference signs of FIG. 4 will be used. FIG. 5 also shows the new PM objects used for reporting statistics on the unmirrored objects, namely the EUtranRelation PM object 360, which is the PM object related to the unmirrored EUtranRelation objects 340a, 340b, 340c and optionally also for the mirrored EUtranRelation object 340, and the ExternalEUtranGenericCell PM object 440, which is the PM object related to the unmirrored ExternalEUtranGenericCell objects 420a, 420b, 420c and optionally also for the External ExternalEUtranGenericCell object 420.

The PM objects can be implemented for CRs and ECs, but also for any other object type where unmirrored objects are used. In the following, it will, without limitation, only be referred to the PM objects implemented for CRs and ECs as shown in FIG. 5.

In the following, the use of the object model of FIG. 5 is described with reference to the schematic architecture of FIG. 1. In the following, it is assumed that, in the view of the eNB 10, the EUtranGenericCell object 320 is associated with the cell served by eNB 10, the ExternalEUtranGenericCell object 420 is associated with the cell served by the eNB 12 and a further ExternalEUtranGenericCell object 420a is associated with the cell served by eNB 14. The ExternalEUtranGenericCell object 420 and likewise the EUtranRelation 340 (i.e., the relation from eNB 10 to eNB 12) are mirrored objects, i.e. they are visible to the OAM system (the OAM system is able to observe said objects). On the contrary, the further ExternalEUtranGenericCell object 420a and likewise the further EUtranRelation object 340a (i.e., the relation from eNB 10 to eNB 14) of FIG. 4 are unmirrored objects, i.e. they are invisible to the OAM system (the OAM system is not able to observe said objects).

Further assuming that a UE is located in the cell served by the eNB 10, i.e., the eNB 10 is the serving eNB 10. If the UE enters the cell served by the eNB 12, a handover from the eNB 10 to the eNB 12 is initiated and, as a result of this handover, the eNB 12 becomes the new serving eNB of the UE. By means of this handover from the eNB 10 to the eNB 12, the EUtranRelation object 340 is used and therefore PM data related to the EUtranRelation object 340 is transmitted to the OAM system.

Still further assuming that a further UE moves from the cell served by the eNB 10 into the cell served by the eNB 14, then, a handover from the eNB 10 to the eNB 14 is initiated and, as a result of this handover, the eNB 14 becomes the new serving eNB of the further UE. By means of this handover from the eNB 10 to the eNB 14, the further EUtranRelation object 340a is used. However, as the further EUtranRelation object 340a is an unmirrored object, PM data related to the EUtranRelation object 340a is not transmitted to the OAM system in the conventional manner. Rather, the PM data associated with the further EUtranRelation object 340a is accumulated on the ExternalEUtranRelation PM object 360. In addition, also PM data associated with even further EUtranRelation objects 340b, 340c (FIG. 4) may be accumulated on the EUtranRelation PM object 360. The accumulated PM data may then be transmitted to the OAM system using the EUtranRelation PM object 360.

In this way, the PM signaling to the OAM system is reduced in comparison with the object model shown in FIG. 3, as the PM data for the EUtranRelation objects is not transmitted separately for all objects, but is accumulated on the EUtranRelation PM object for the unmirrored objects. In comparison with the object model described before with reference to FIG. 4 only, the OAM signaling may be a little higher (as described before with reference to FIG. 4, no PM data is reported for the unmirrored objects), but, by providing accumulated PM data for multiple unmirrored objects, the OAM system receives PM information from and about the unmirrored objects. When the object model is used in the way as described with reference to FIG. 4 only, however, no PM data feedback is provided to the OAM system for the unmirrored objects.

As a variant of the above described PM data reporting of the mirrored objects, also the mirrored objects may be accumulated on the respective PM objects. For example, the PM data associated with the mirrored EUtranRelation object 340 may be accumulated on the EUtranRelation PM object 360 together with the PM data of the unmirrored EUtranRelation object(s) 340a, 340b, 340c.

As an alternative to the use of the newly created PM objects statistics on the unmirrored objects can be carried on a parent object of the unmirrored object. For example, statistics of unmirrored EUtranRelation objects 340a, 340b, 340c may be carried on the EUtranGenericCell object 320. This will be illustrated below again with reference to the schematic architecture of FIG. 1 and with reference to FIG. 4.

In the following, it is assumed that, in the view of the eNB 10, the EUtranGenericCell object 320 is associated with the cell served by eNB 10, the ExternalEUtranGenericCell object 420 is associated with the cell served by the eNB 12 and a further ExternalEUtranGenericCell object 420a is associated with the cell served by eNB 14. The External- EUtranGenericCell object 420 and likewise the EUtranRelation 340 (i.e., the relation from eNB 10 to eNB 12) are mirrored objects, i.e. it they are visible to the OAM system (the OAM system is able to observe said objects). On the contrary, the further ExternalEUtranGenericCell object 420*a* and likewise the further EUtranRelation object 340*a* (i.e., the relation from eNB 10 to eNB 14) are unmirrored objects, i.e. it they are invisible to the OAM system (the OAM system is not able to observe said objects).

Further assuming that a UE is located in the cell served by the eNB 10, i.e., the eNB 10 is the serving eNB 10. If the UE enters the cell served by the eNB 12, a handover from the eNB 10 to the eNB 12 is initiated and, as a result of this handover, the eNB 12 becomes the new serving eNB of the UE. By means of this handover from the eNB 10 to the eNB 12, the EUtranRelation object 340 is used and therefore PM data related to the EUtranRelation object 340 is transmitted to the OAM system.

Still further assuming that a further UE moves from the cell served by the eNB 10 into the cell served by the eNB 14, then, a handover from the eNB 10 to the eNB 14 is initiated and, as a result of this handover, the eNB 14 becomes the new serving eNB of the further UE. By means of this handover from the eNB 10 to the eNB 14, the further EUtranRelation object 340*a* is used. However, as the further EUtranRelation object 340*a* is an unmirrored object, PM data related to the EUtranRelation object 340*a* is not transmitted to the OAM system in the conventional manner. Rather, the PM data associated with the further EUtranRelation object 340*a* is accumulated on a parent object of the further EUtranRelation object 340*a*. In the following, it is assumed, by way of example, that the direct parent object of the further EUtranRelation object 340*a* is used, namely the EUtranGenericCell object 320. Thus, the PM data associated with the further EUtranRelationobject 340*a* is accumulated on the EUtranGenericCell object 320. In addition, also PM data associated with still further EUtranRelationobjects 340*b*, 340*c* may be accumulated on the EUtranGenericCell object 320. The accumulated PM data may then be transmitted to the OAM system by using the EUtranGenericCell object 320.

In this way, the PM signaling to the OAM system is reduced in comparison with the object model shown in FIG. 3, as the PM data for the EUtranRelation objects is not transmitted separately for all objects, but is accumulated on the EUtranGenericCell object 320 for the unmirrored objects. In comparison with the object model previously described with reference to FIG. 4 only, the OAM signaling may be a little higher (as described before with reference to FIG. 4 only, no PM data is reported for the unmirrored objects), but, by providing accumulated PM data for multiple unmirrored objects, the OAM system receives PM information from the unmirrored objects. When using the object model as previously described with reference to FIG. 4, in which no PM data is signaled for unmirrored objects, however, no PM data feedback is provided to the OAM system for the unmirrored objects.

As a variant to the above described PM data reporting of the mirrored objects, also the mirrored objects may be accumulated on the respective parent objects. For example, the PM data associated with the mirrored EUtranRelation object 340 may be accumulated on the EUtranGenericCell object 320 together with the PM data of the unmirrored EUtranRelation object(s) 340,*a*, 340*b*, 340*c*.

Before the above described aspects will be further explained with respect to exemplary method embodiments, the basic structure enabling the PM reporting will be briefly explained, by way of example.

Figure 6:
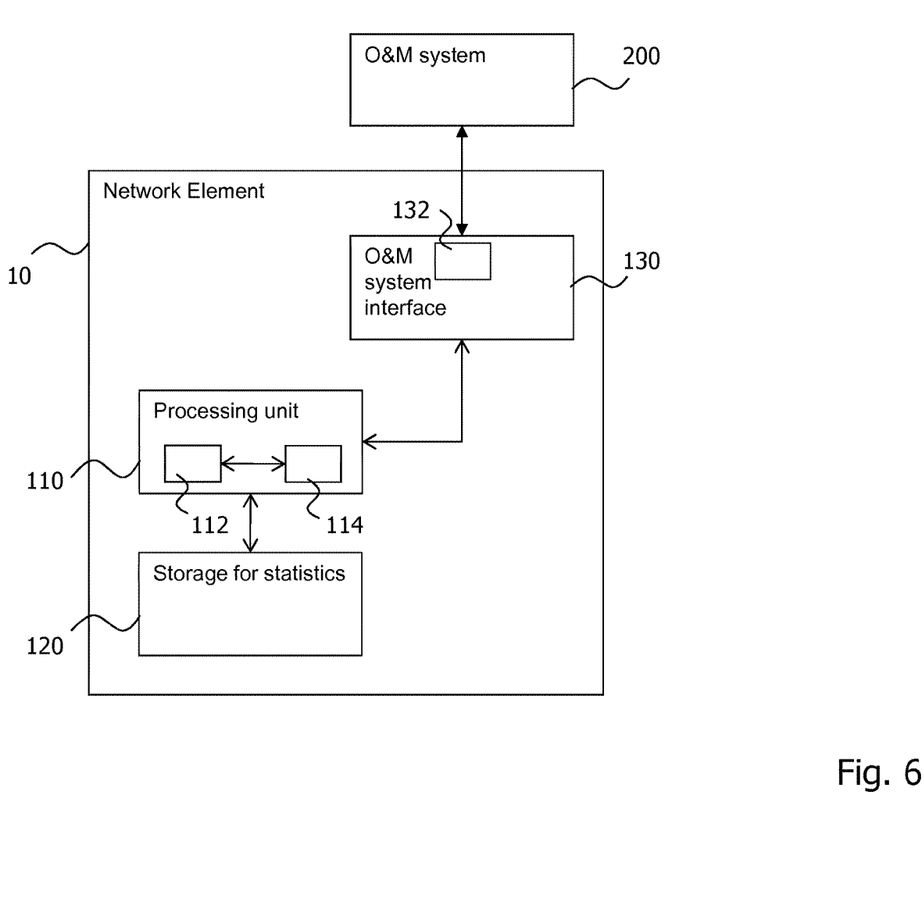
FIG. 6 is a schematic illustration of a general architecture of a network element according to an embodiment.

As can be seen in FIG. 6, a network element 10 and an OAM system 200 are provided, which are connected with each other. The network element 10 comprises a processing unit 110, a storage unit 120 and an OAM system interface 130. The storage unit 120 is configured to store PM data like statistics related to the network element 10. The processing unit is connected with the storage unit 120 and is configured to process data related to the PM data or the PM data itself. The OAM system interface 130 is connected with the processing unit 110 and is configured to bidirectionally exchange information with the OAM system 200.

Figure 7:
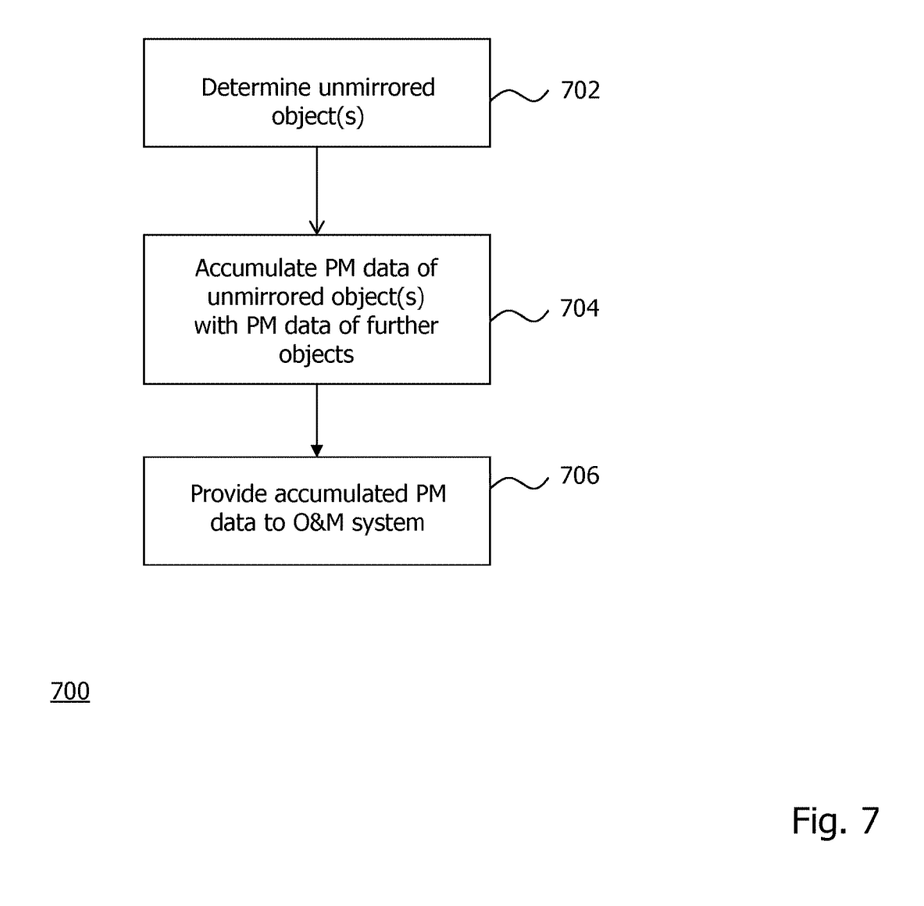
FIG. 7 is a schematic illustration of a flowchart of a first method embodiment.

More details will now be explained with reference to the first method embodiment shown in FIG. 7. All of the above-described aspects may be applied in combination with or independent from each other to the first and second method embodiments described below with reference to FIGS. 7 and 8.

The processing unit 110 comprises a determining component 112 configured to determine, in step 702, whether at least one of the one or more objects is an unmirrored object and an accumulating component 114 configured to, if at least one of the one or more objects is an unmirrored object, accumulate, in step 704, PM data of the at least one unmirrored object with PM data of further objects associated with the network element. The OAM system interface 130 comprises a transmitting component 132 configured to provide, in step 706, the accumulated PM data to the OAM system 200.

In more detail, the processing unit 110 is configured to determine, by means of the determining component 112, if there are any unmirrored objects associated with the network element 10 for which PM data is to be provided to the OAM system (step 702). If there are one or more unmirrored objects for which PM data shall be provided to the OAM system 200, the processing unit 110 is configured to retrieve the PM data of the unmirrored objects from the storage unit 120. Further, the processing unit 110 is configured to accumulate, by means of the accumulating component 114, the retrieved PM data of the unmirrored objects with PM data of further objects associated with the network element (step 704). Then, the processing unit 110 is configured to forward the accumulated PM data to the OAM system interface 130.

The OAM system interface 130 is configured to receive the accumulated PM data. Further, the OAM system interface 130 is configured to provide, e.g., transmit, the accumulated PM data to the OAM system 200 by means of the transmitting component 132 (step 706).

The PM data can be accumulated by the processing unit 110 in a number of different ways.

For example, as explained above with reference to FIG. 5, there may be one PM object per unmirrored object class, for which statistics may be accumulated. In other words, the processing unit 110 may be configured to accumulate PM data of unmirrored PM objects belonging to the same object class on one PM object. For example, the processing unit 110 may be configured to accumulate PM data of one unmirrored PM object on one PM object. Alternatively, the processing unit 110 may be configured to accumulate the PM data of two or more unmirrored objects on one PM object. If there are different object classes with unmirrored objects under the same parent object, there can be several PM objects under the same parent object.

It is conceivable that the processing unit 110 is configured to put the PM data, e.g., the statistics, retrieved from the storage 120 for one or more unmirrored objects on a parent object, or an otherwise accumulating class. For example, the processing unit 110 may put counters for accumulated CR objects like an unmirrored EUtranRelation object 340a on an EUtranGenericCell object 320.

An alternative to accumulating statistics for unmirrored objects only, is to accumulate statistics for both mirrored and unmirrored objects. The separation between mirrored and unmirrored objects can then be made in the OAM system that has knowledge of the total accumulated statistics and the individual statistics for the mirrored objects. This alternative has the advantage that the accumulated statistics for all objects is always available, even if the OAM 200 system does not gather any statistics on individual objects.

For example, the PM objects can be used by the processing unit 110 to also accumulate statistics for mirrored objects, thereby reducing the PM load on the OAM system. In this way, PM data of unmirrored and mirrored objects may both be accumulated, e.g. on the same or on separate PM objects. To give one example, PM data of the mirrored EUtranRelation object 340 may be accumulated with PM data of the unmirrored EUtranRelation object(s) 340a, 340b, 340c on the EUtranRelation PM object 360 as the newly created PM object or on the EUtranGenericCell object 320 as the parent object.

It is also conceivable that the processing unit 110 includes PM data like statistics for unmirrored objects as well as PM data like statistics for mirrored objects for which the OAM system 200 does not gather individual statistics. For the other mirrored objects, the OAM system 200 gathers the PM data in the conventional way and therefore, the processing unit 110 does not accumulate any PM data for said other mirrored objects. In this way, statistics for a selected part of the objects is available as individual statistics (for the mirrored objects which are conventionally observed) and statistics for all the other objects, i.e., mirrored without individual statistics and unmirrored objects, are available in the accumulated statistics.

To make it easier to for the operator to activate statistics on more individual objects that contribute significantly, but for which the OAM system 200 does not gather individual statistics, the identities of these objects could be written into attributes on the object by the processing unit 110 where the accumulated counter is reported. The operator can then easily see what object or objects contribute most to the statistics and chose to activate individual counters for these.

Figure 8:
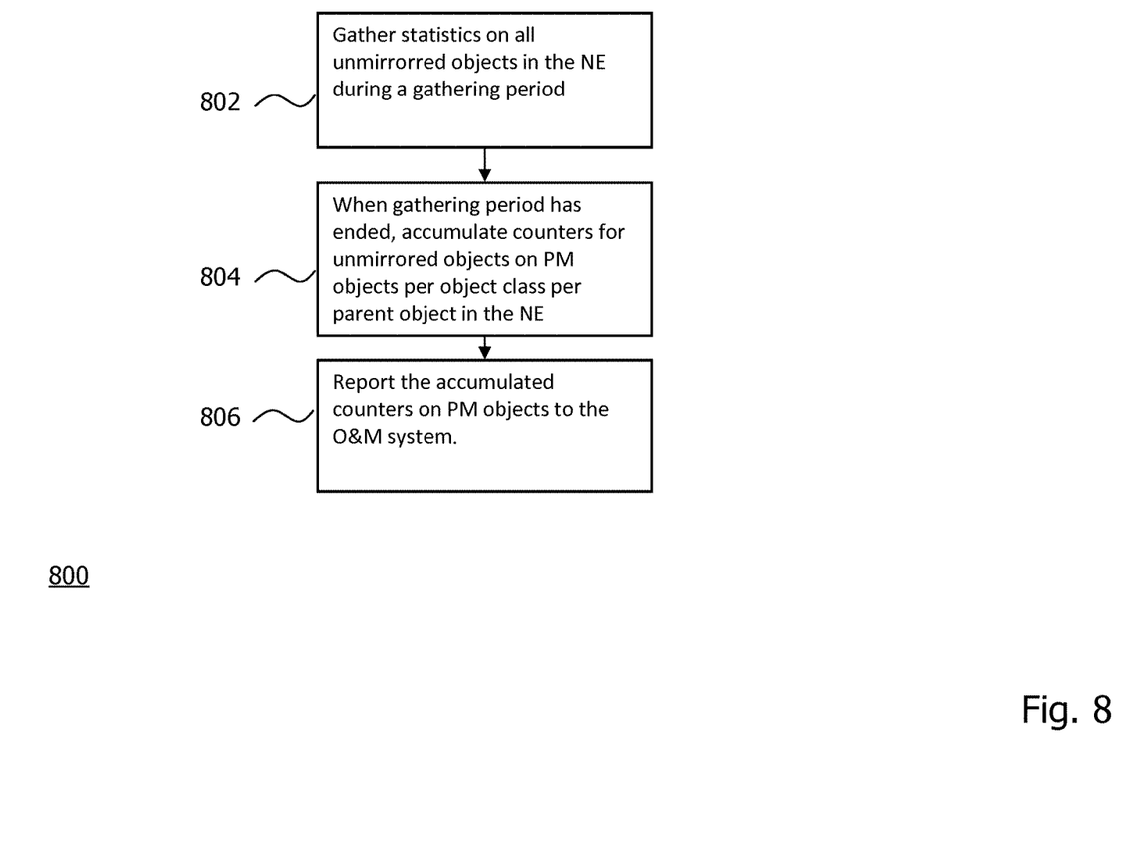
FIG. 8 is a schematic illustration of a flowchart of a second method embodiment.

FIG. 8 shows a further method embodiment. In particular, FIG. 8 illustrates one possible realization of the accumulating step 704 and the providing step 706 of FIG. 7.

In step 802, the processing unit 110 gathers statistics on all unmirrored objects in the network element 10 (in which the processing unit 110 is arranged) during a certain gathering period. The gathering period may be fixed or may be changed by the processing unit 110 based on information provided by the OAM system 200. The gathering period may be one or more minutes and up to one or several hours. Just to give some examples for illustration rather than limitation, examples of gathering periods can be 5 min, 15 min, 30 min or 1 hour.

After the gathering period, i.e., when the gathering period has ended, the processing unit 110 accumulates counters for the unmirrored objects in step 804. For example, the processing unit 110 accumulates said counters on PM objects per object class per parent object.

In step 806, the processing unit forwards the accumulated counters to the OAM system interface 130 which itself then reports the accumulated counters on PM objects to the OAM system 200.

The second method embodiment will now be further explained below with reference to the schematic architecture of FIG. 1.

In the following, it is assumed that, in the view of the eNB 10, the EUtranGenericCell object 320 is associated with the cell served by eNB 10, the ExternalEUtranGenericCell object 420 is associated with the cell served by the eNB 12 and a further ExternalEUtranGenericCell object 420a is associated with the cell served by eNB 14. The ExternalEUtranGenericCell object 420 and likewise the EUtranRelation 340 (i.e., the relation from eNB 10 to eNB 12) are mirrored objects, i.e. they are visible to the OAM system (the OAM system is able to observe said objects). On the contrary, the further ExternalEUtranGenericCell object 420a and likewise the further EUtranRelation object 340a (i.e., the relation from eNB 10 to eNB 14) are unmirrored objects, i.e. they are invisible to the OAM system 200 (the OAM system 200 is not able to observe said objects).

Further assuming that a first UE is located in the cell served by the eNB 10, i.e., the eNB 10 is the serving eNB 10. If the first UE enters the cell served by the eNB 12, a handover from the eNB 10 to the eNB 12 is initiated and, as a result of this handover, the eNB 12 becomes the new serving eNB of the first UE. By means of this handover from the eNB 10 to the eNB 12, the EUtranRelation object 340 is used and therefore PM data related to the EUtranRelation object 340 is transmitted to the OAM system 200.

Still further assuming that a second UE moves from the cell served by the eNB 10 into the cell served by the eNB 14, then, a handover from the eNB 10 to the eNB 14 is initiated and, as a result of this handover, the eNB 14 becomes the new serving eNB of the further UE. Still further assuming that a third UE moves from the cell served by the eNB 10 into another cell served by further eNB (eNB), then, a handover from the eNB 10 to the further eNB is initiated and, as a result of this handover, the further eNB becomes the new serving eNB of the third UE. By means of these handovers from the eNB 10 to the eNB 14 and from the eNB 10 to the further eNB (not shown), two EUtranRelation objects 340a, 340b are used. However, as the two EUtranRelation objects 340a, 340b are unmirrored objects, PM data related to the two EUtranRelation objects 340a, 340b is not transmitted to the OAM system 200 in the conventional manner. Rather, the PM data associated with the two EUtranRelation object 340a, 340b are gathered during the gathering period (step 802). The gathering period may be flexibly adjusted or may be a fixed period of time.

After the gathering period has ended, the PM data of all unmirrored objects like the unmirrored EUtranRelation objects 420a, 420b is accumulated on a corresponding PM object or parent object (step 804). Thus, the PM data associated with all EUtranRelation objects 340a, 340b is accumulated on one single object. The accumulated PM data is then transmitted to the OAM system using the single object, e.g, the single PM object or the single parent object (step 806).

As a variant to the above described PM data reporting of the mirrored objects, also the mirrored objects may be accumulated on the respective PM object or parent objects, whatever is used for the unmirrored objects. For example, the PM data associated with the mirrored EUtranRelation object 340 may be accumulated on the EUtranRelationPM object 360 or the EUtranGenericCell object 320 together with the PM data of the unmirrored EUtranRelation object(s) 340a, 340b.

By means of the above described embodiments and variants of the embodiments, it is, in a big network with a great number of cells, where some objects, e.g. neighbour cells and cell relations, are not mirrored in the OAM system, still possible to observe the unmirrored cells. Also for mirrored objects, the PM load on the OAM system can be reduced.

The solution can be implemented using existing object classes according to e.g. 3GPP TS 32.762, using specific attribute values that identify the PM objects, or by defining new object classes beside the mirrored and unmirrored ones for which statistics are reported. If new object classes are used, it could with attributes indicate the identities of the objects for which the statistics are accumulated.

It is believed that many advantages of the present disclosure will be fully understood from the foregoing description and it will be apparent that various changes may be made in the form, construction and arrangement of the exemplary aspects thereof without departing from the scope of the present disclosure or without sacrificing all of its advantages. Because the present disclosure can be varied in many ways, it will be recognized that the present disclosure should be limited only by the scope of the following claims.

The invention claimed is:

1. A method of providing performance management (PM), data by a network element of a wireless network to an Operations and Maintenance (OAM), system to which the network element is connected, the PM data being related to one or more objects associated with the network element, the method comprising:
   determining by the network element, whether at least one of the one or more objects is an unmirrored object, the unmirrored object being invisible to the OAM system;
   responsive to at least one of the one or more objects being an unmirrored object, accumulating, by the network element, PM data of the at least one unmirrored object with PM data of further objects associated with the network element; and
   providing, by the network element, the accumulated PM data to the OAM system,
   wherein the accumulating comprises accumulating the PM data of all unmirrored objects belonging to a same object class.

2. The method of claim 1, wherein the further objects are unmirrored objects associated with the network element and belonging to the same object class as the at least one unmirrored object, and the accumulating comprises accumulating the PM data of the at least one unmirrored object with the PM data of the further unmirrored objects.

3. The method of claim 1, wherein the accumulating comprises accumulating the PM data, per object class, on a newly created object and the providing comprises reporting the accumulated PM data to the OAM system on the newly created object.

4. The method of claim 1, wherein the accumulating comprises at least one of accumulating PM data of unmirrored objects relating to the same object class on the same newly created object and accumulating the PM data of a different object class on a different newly created object.

5. The method of claim 1, wherein the accumulating comprises accumulating the PM data, per object class, on a parent object of the at least one unmirrored object and the providing comprises reporting the accumulated PM data to the OAM system on the parent object.

6. The method of claim 1, wherein the at least one unmirrored object comprises or is configured as at least one of a neighbour cell object providing information on a neighbour network element of the network element and a neighbour cell relation object providing information on a relationship between the network element and a neighbour network element.

7. The method of claim 1, wherein the method further comprises the determining, by the network element, whether at least one of the one or more objects is a mirrored object, the mirrored object being visible to the OAM system, wherein the method further comprises, if at least one of the one or more objects is a mirrored object, accumulating PM data of the at least one mirrored object with the PM data of the at least one unmirrored object.

8. The method of claim 1, wherein the providing further comprises reporting information about the identities of the at least one object and the further objects for which the PM data is accumulated.

9. The method of claim 1, wherein the at least one object is at least one of an object according to the 3GPP object model and a representation of a resource in the network element, providing one or more interfaces to observe and manage the resource.

10. A computer program product comprising a non-transitory computer readable storage medium storing program code portions, which, when the computer program is run on one or more computing devices, perform the steps of the method of claim 1.

11. A network element of a communications network for providing performance management, PM, data to an Operations and Maintenance, OAM, system to which the network element is connected, the PM data being related to one or more objects associated with the network element, the network element comprising:
   processor circuitry configured to:
      determine whether at least one of the one or more objects is an unmirrored object, the unmirrored object being invisible to the OAM system;
      accumulate PM data of the at least one unmirrored object with PM data of further objects associated with the network element responsive to at least one of the one or more objects being an unmirrored object; and
   a system interface coupled to the processor circuitry, the system interface configured to provide the accumulated PM data to be transmitted through the system interface to the OAM system,
   wherein the processor circuitry is further configured to accumulate the PM data by accumulating the PM data of all unmirrored objects belonging to the same object class.

12. The network element of claim 11, wherein the processing circuitry is further configured to:
   determine whether at least one of the one or more objects is a mirrored object for which PM data is observable by the OAM system; and
   accumulate PM data of the at least one mirrored object with the PM data of the at least one unmirrored object responsive to at least one of the one or more objects is a mirrored object.

13. The network element of claim 11, wherein the network element comprises or is configured as a radio base station, a radio network controller or a base station controller.

14. A radio communication system comprising:
   a network element configured to:
      determine whether at least one of one or more objects is an unmirrored object, the unmirrored object being invisible to an Operations and Maintenance, OAM, system;

accumulate PM data of the at least one unmirrored object with PM data of further objects associated with the network element responsive to at least one of the one or more objects being an unmirrored object;

transmit the accumulated PM data to through a system interface;

wherein the OAM system is configured to request and maintain the PM data transmitted by the network element; and wherein the network element is further configured to accumulate the PM data by accumulating the PM data of all unmirrored objects belonging to the same object class.

* * * * *